US012148558B2

(12) United States Patent
Shiokawa

(10) Patent No.: US 12,148,558 B2
(45) Date of Patent: Nov. 19, 2024

(54) WOUND INDUCTOR COMPONENT

(71) Applicant: Murata Manufacturing Co., Ltd., Kyoto-fu (JP)

(72) Inventor: Noboru Shiokawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 643 days.

(21) Appl. No.: 17/475,258

(22) Filed: Sep. 14, 2021

(65) Prior Publication Data

US 2022/0093311 A1 Mar. 24, 2022

(30) Foreign Application Priority Data

Sep. 18, 2020 (JP) ................................ 2020-157340

(51) Int. Cl.

*H01F 17/04* (2006.01)
*H01F 27/02* (2006.01)
*H01F 27/24* (2006.01)
*H01F 27/29* (2006.01)
*H01F 27/32* (2006.01)

(52) U.S. Cl.

CPC ............. *H01F 27/02* (2013.01); *H01F 27/24* (2013.01); *H01F 27/29* (2013.01); *H01F 27/32* (2013.01)

(58) Field of Classification Search

CPC ....................................................... H01F 27/29
USPC .......................................................... 336/221
See application file for complete search history.

(56) References Cited

U.S. PATENT DOCUMENTS 6,154,112 A * 11/2000 Aoba .................... H01F 27/292 336/200
11,515,081 B2 * 11/2022 Takahashi ................. H01F 3/14
2003/0071704 A1 * 4/2003 Toi .......................... H01F 27/36 336/83
2005/0145408 A1 * 7/2005 Hess .................... H05K 3/3442 174/541
2006/0033603 A1 * 2/2006 Hirai ..................... H01F 17/045 336/200
2007/0063804 A1 * 3/2007 Watanabe ................. H01F 3/10 336/83
2008/0055034 A1 * 3/2008 Tsunemi ................... H01F 3/10 336/83

(Continued)

FOREIGN PATENT DOCUMENTS

CN 211350259 U 8/2020
JP H10-321438 A 12/1998

(Continued)

*Primary Examiner* — Ronald Hinson
(74) *Attorney, Agent, or Firm* — Studebaker & Brackett PC

(57) ABSTRACT

In a wound inductor component, a first flange and a second flange are connected to both ends of a winding core in the central axial line direction, and protrude from the winding core to both sides in a height direction. A cover member covers a portion from the upper end of the first flange to the upper end of the winding core from above. In a sectional view including the central axial line and along the height direction, a first average distance, which is an average distance in the height direction from the upper end of the first flange to the upper end of the cover member, is 25% or more and 45% or less (i.e., 25% to 45%) of a second average distance, which is an average distance in the height direction from the upper end of the winding core to the upper end of the cover member.

20 Claims, 6 Drawing Sheets

(56) References Cited

U.S. PATENT DOCUMENTS

| | | | | |
|---|---|---|---|---|
| 2008/0224813 | A1* | 9/2008 | Hirai | H01F 17/045 336/216 |
| 2015/0028985 | A1* | 1/2015 | Inubushi | H01F 17/04 264/319 |
| 2016/0027574 | A1* | 1/2016 | Aoki | H01F 17/045 336/192 |
| 2018/0286554 | A1* | 10/2018 | Kojima | H01F 17/045 |
| 2019/0080836 | A1* | 3/2019 | Yasuda | H01F 27/29 |

FOREIGN PATENT DOCUMENTS

| | | | |
|---|---|---|---|
| JP | 2002-057053 | A | 2/2002 |
| JP | 2011-171544 | A | 9/2011 |

* cited by examiner

WOUND INDUCTOR COMPONENT

CROSS-REFERENCE TO RELATED APPLICATION

This application claims benefit of priority to Japanese Patent Application No. 2020-157340 filed Sep. 18, 2020, the entire content of which is incorporated herein by reference.

BACKGROUND

Technical Field

The present disclosure relates to a wound inductor component.

Background Art

The core of the wound inductor component described in Japanese Patent Application Laid-Open No. 2011-171544 includes a columnar winding core. A pair of flanges is connected to both ends of the winding core in the central axial line direction. Each flange protrudes outward from the surface of the winding core in the direction orthogonal to the central axial line. A terminal electrode is provided at a lower end of each flange. A wire is wound around the winding core. The upper surface of the core is covered with a cover member made of epoxy resin. The cover member covers a range from one flange to the other flange in the central axial line direction. That is, the cover member covers the wire wound around the pair of flanges of the core and the winding core from above.

SUMMARY

In the wound inductor component as described in Japanese Patent Application Laid-Open No. 2011-171544, the cover member expands or contracts due to a change in temperature. For example, in a thermal shock test on the assumption of being mounted on a vehicle, since the temperature changes extremely, there is a possibility that the cover member is cracked or the like due to expansion and contraction of the cover member.

Accordingly, one aspect of the present disclosure provides a wound inductor component including a columnar winding core; and a first flange and a second flange which are connected to both ends of the winding core in a central axial line direction and protrude from the winding core to both sides in a first direction orthogonal to the central axial line direction of the winding core when a line through which a center of the winding core passes in an extending direction of the winding core is defined as a central axial line and a direction in which the central axial line extends is defined as a central axial line direction; a wire wound around the winding core. The wound inductor component further includes a cover member covering, from one side in the first direction, a portion from an end on one side of the first flange in the first direction to an end on one side of the winding core in the first direction. A first average distance that is an average distance in the first direction from an end on one side of the first flange in the first direction to a surface on one side of the surface of the cover member is 25% or more and 45% or less (i.e., from 25% to 45%) of a second average distance that is an average distance in the first direction from an end on one side of the winding core in the first direction to the surface on one side of the surface of the cover member in a sectional view including the central axial line and along the first direction.

In addition, another aspect of the present disclosure provides a wound inductor component including a columnar winding core; and a first flange and a second flange which are connected to both ends of the winding core in a central axial line direction and protrude from the winding core to both sides in a first direction orthogonal to the central axial line direction of the winding core when a line through which a center of the winding core passes in an extending direction of the winding core is defined as a central axial line and a direction in which the central axial line extends is defined as a central axial line direction; a wire wound around the winding core, The wound inductor component further includes a cover member covering, from one side in the first direction, a portion from an end on one side of the first flange in the first direction to an end on one side of the winding core in the first direction. A first average distance that is an average distance in the first direction from an end on one side of the first flange in the first direction to a surface on one side of the surface of the cover member is 40 μm or more and 100 μm or less (i.e., from 40 μm to 100 μm).

According to the above configurations, it is possible to adopt a configuration in which the difference between the thickness of the portion covering the winding core and the thickness of the portion covering the flange of the cover member is not excessively large. Therefore, regardless of thermal expansion or contraction of the cover member, the difference in the amount of expansion or contraction between the portion covering the winding core and the portion covering the flange of the cover member does not become excessively large. Therefore, regardless of exposure of the cover member to an extreme temperature change, for example, assuming an in-vehicle level, it is possible to suppress occurrence of damage starting from a place where the thickness of the cover member changes.

Regardless of a thermal shock applying to the cover member of the wound inductor component, the occurrence of damage to the cover member can be suppressed.

DETAILED DESCRIPTION

Figure 1:
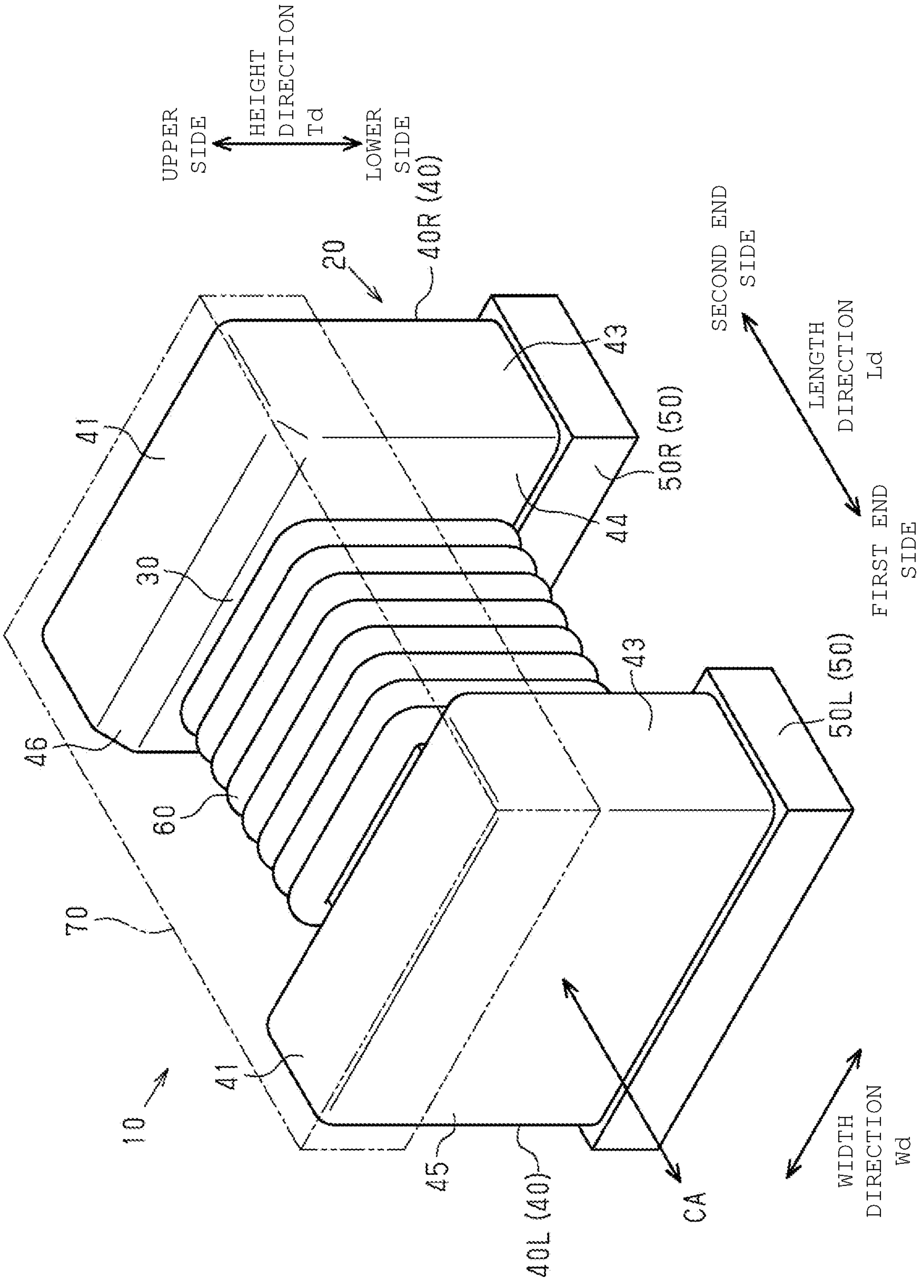
FIG. 1 is a perspective view of a wound inductor component according to a first embodiment.

Hereinafter, each embodiment of a wound inductor component will be described with reference to the drawings. Note that, in the drawings, components may be illustrated in an enlarged manner for easy understanding. The dimensional ratios of the components may be different from the actual ones or those in another drawing.

First Embodiment

First, a first embodiment of a wound inductor component will be described.

As illustrated in FIG. 1, in a wound inductor component 10, a core 20 includes a winding core 30 having a regular quadrangular prism shape and a pair of flanges 40 connected to both ends of the winding core 30 in a central axial line CA direction. The material of the core 20 is a magnetic body such as nickel-zinc ferrite. The core 20 is a sintered body formed by firing a sintered body obtained by compressing a powdery magnetic body.

In the following description, a line through which the center of the winding core 30 passes in the direction in which the winding core 30 extends is defined as the central axial line CA, and the direction in which the central axial line CA extends is defined as a central axial line CA direction. The central axial line CA direction of the winding core 30 is defined as a length direction Ld. In mounting the wound inductor component 10 on a substrate or the like, when a surface facing the substrate or the like is a mounting surface, a direction orthogonal to both the length direction Ld and the mounting surface is defined as a height direction Td. That is, in FIG. 1, the vertical direction is defined as the height direction Td. A direction orthogonal to both the length direction Ld and the height direction Td is defined as a width direction Wd.

The dimension of the winding core 30 in the length direction Ld is 800 μm. The dimension of the winding core 30 in the height direction Td is 400 μm.

A first flange 40L as one of the pair of flanges 40 is connected to a first end of the winding core 30 in the central axial line CA direction. The first flange 40L has a substantially rectangular parallelepiped shape which is flat and has a small dimension in the length direction Ld as a whole. The first flange 40L has a rectangular shape when viewed in the length direction Ld.

Figure 2:
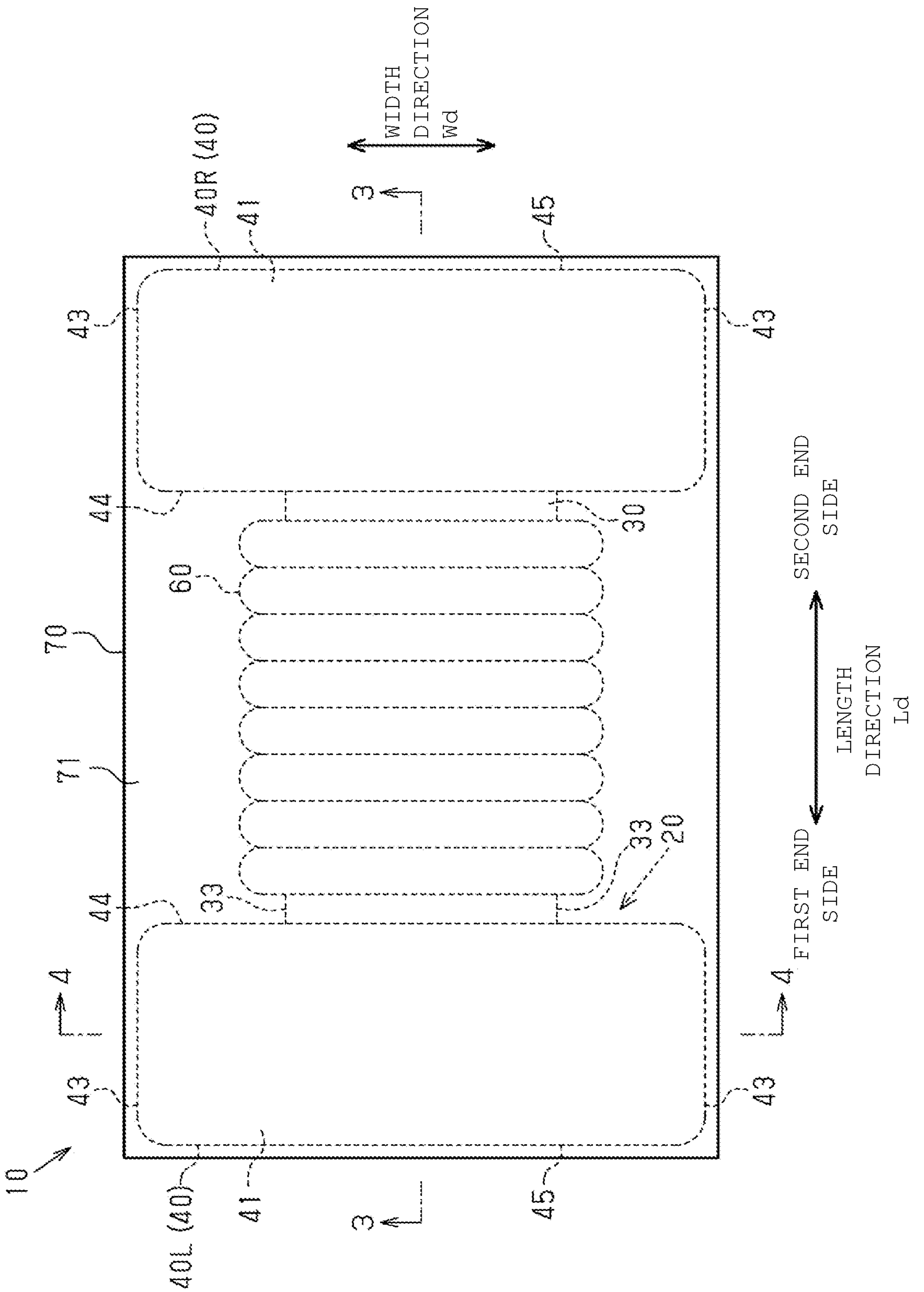
FIG. 2 is a top view of the wound inductor component according to the first embodiment.
Figure 3:
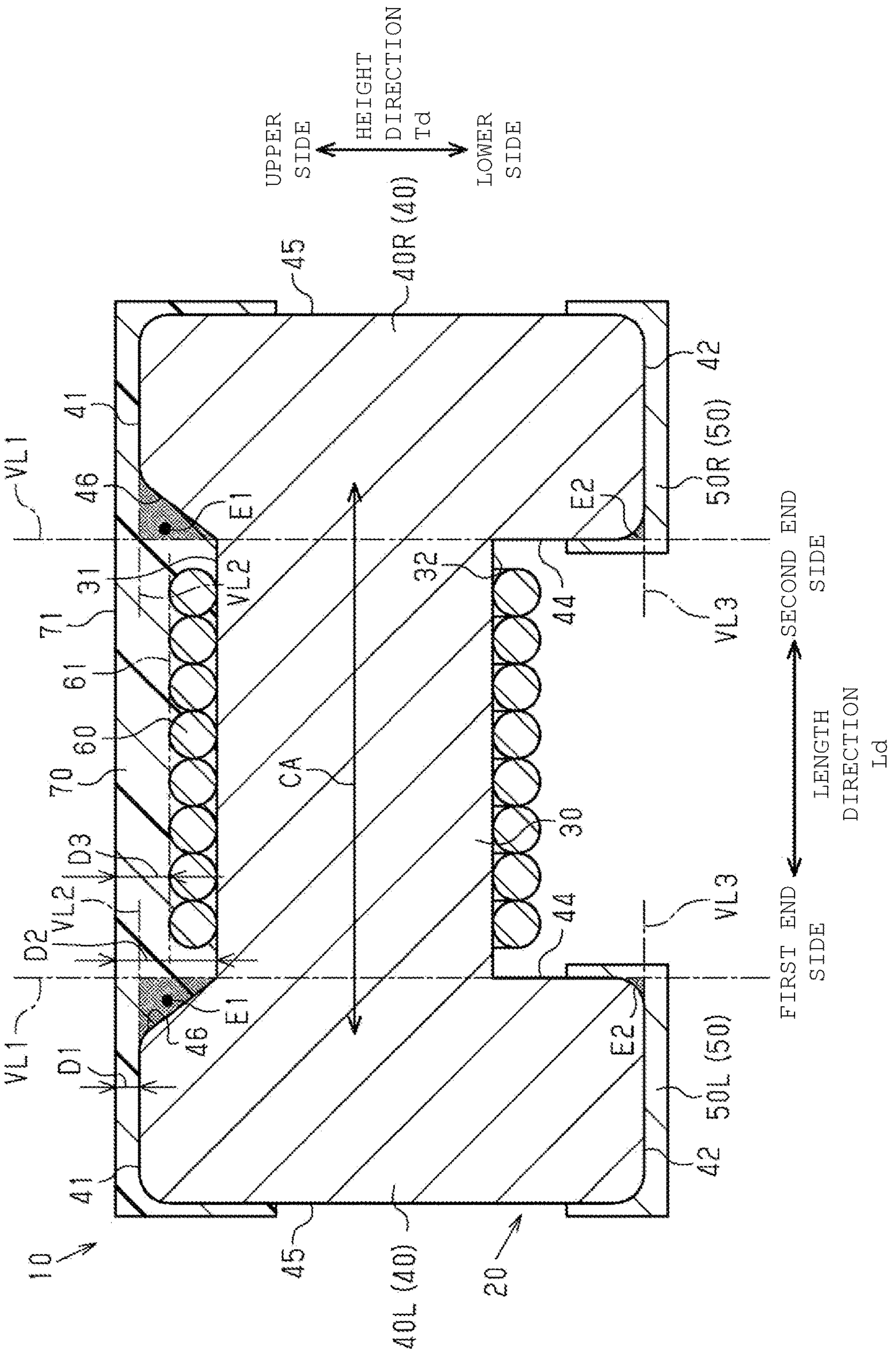
FIG. 3 is a sectional view taken along line 3-3 in FIG. 2.

As illustrated in FIG. 3, an upper end surface 41 which is an upper surface in the height direction Td of the surface of the first flange 40L is parallel to an upper surface 31 which is an upper surface in the height direction Td of the winding core 30. A lower end surface 42 which is a lower surface in the height direction Td of the surface of the first flange 40L is parallel to a lower surface 32 which is a lower surface in the height direction Td of the winding core 30. As illustrated in FIG. 2, lateral surfaces 43 which are surfaces on both sides of the surface of the first flange 40L in the width direction Wd are parallel to lateral surfaces 33 which are surfaces on both sides of the winding core 30 in the width direction Wd. As illustrated in FIG. 3, an inner surface 44 that is an inner surface in the length direction Ld and an outer surface 45 that is an outer surface in the length direction Ld of the surface of the first flange 40L are orthogonal to the length direction Ld.

The dimension of the first flange 40L in the length direction Ld is 400 μm. The dimension of the first flange 40L in the height direction Td is 800 μm. Therefore, the dimension of the first flange 40L in the height direction Td is larger than the dimension of the winding core 30 in the height direction Td. The first flange 40L protrudes from the winding core 30 to both sides in the height direction Td. Therefore, the upper end surface 41 of the first flange 40L is located above the upper surface 31 of the winding core 30. The lower end surface 42 of the first flange 40L is positioned below the lower surface 32 of the winding core 30. In this embodiment, the height direction Td corresponds to a first direction. The upper side corresponds to one side in the first direction.

The amount of protrusion of the first flange 40L from the winding core 30 is smaller on the upper side than on the lower side. In the present embodiment, the distance from the upper end surface 41 of the first flange 40L to the upper surface 31 of the winding core 30 is 130 μm. The distance from the lower end surface 42 of the first flange 40L to the lower surface 32 of the winding core 30 is 270 μm.

As illustrated in FIG. 2, the dimension of the first flange 40L in the width direction Wd is larger than the dimension of the winding core 30 in the width direction Wd. The first flange 40L protrudes from the winding core 30 toward both sides in the width direction Wd. The amount of protrusion of the first flange 40L from the winding core 30 in the width direction Wd is the same on both sides. That is, the central axial line CA passes through the center of the first flange 40L in the width direction Wd.

Figure 4:
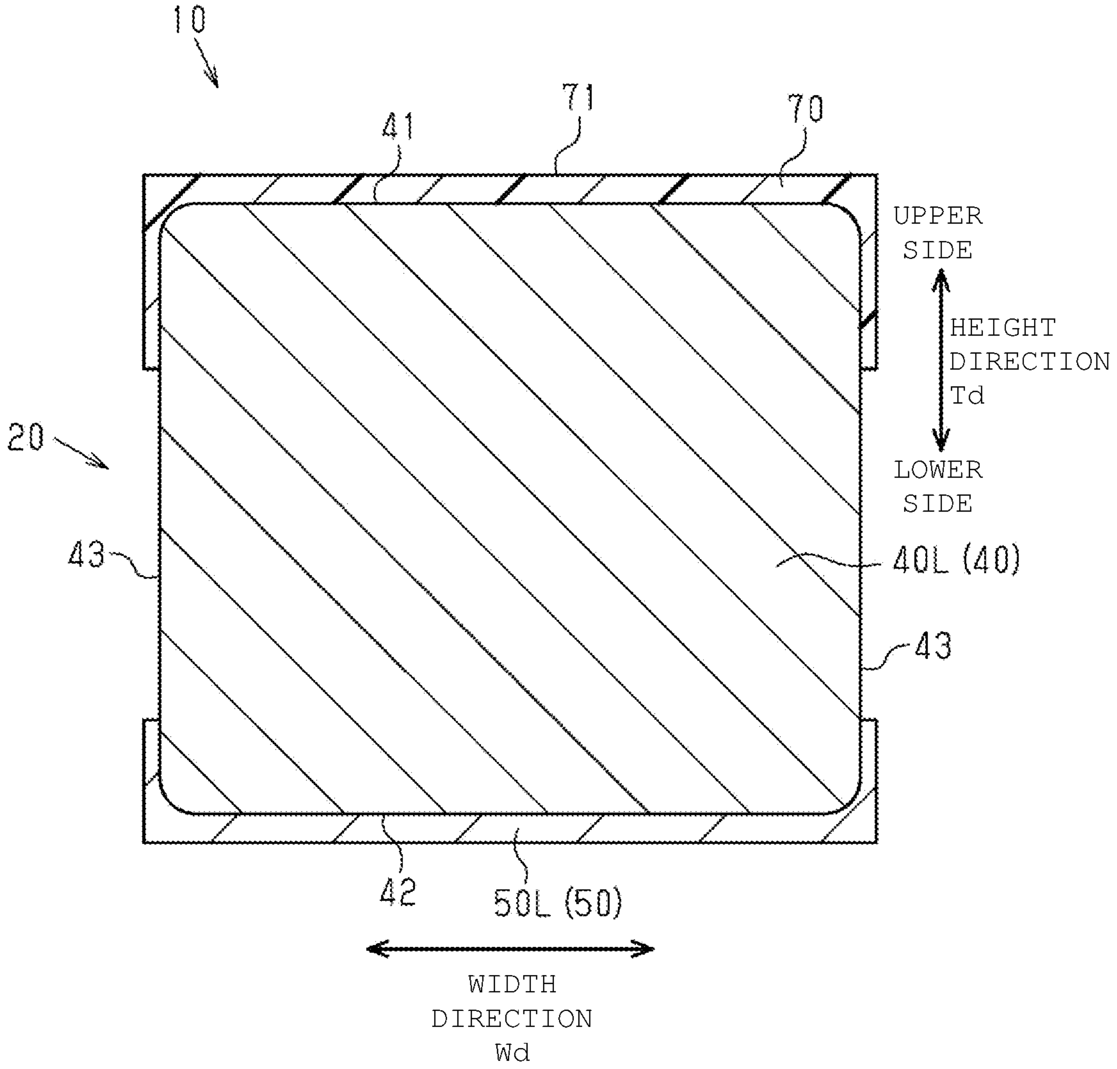
FIG. 4 is a sectional view taken along line 4-4 in FIG. 2.

A boundary portion of each surface constituting the surface of the first flange 40L has a chamfered shape. Specifically, as illustrated in FIG. 2, a boundary portion between the outer surface 45 of the first flange 40L and the both lateral surfaces 43 has a round chamfered shape, that is, an arc shape in a sectional view. As illustrated in FIG. 3, a boundary portion between the outer surface 45 and the upper end surface 41 and a boundary portion between the outer surface 45 and the lower end surface 42 are both formed in a round chamfered shape. As illustrated in FIG. 4, a boundary portion between the both lateral surfaces 43 of the first flange 40L and the upper end surface 41 and a boundary portion between the both lateral surfaces 43 and the lower end surface 42 also have a round chamfered shape. Further, as illustrated in FIG. 2, a boundary portion between the inner surface 44 and the both lateral surfaces 43 of the first flange 40L also has a round chamfered shape, and as illustrated in FIG. 3, a boundary portion between the inner surface 44 and the lower end surface 42 also has a round chamfered shape. The shape of the boundary portion between the inner surface 44 and the upper end surface 41 of the first flange 40L will be described later.

As illustrated in FIG. 1, a second flange 40R as one of the pair of flanges 40 is connected to a second end of the winding core 30 in the central axial line CA direction. The second flange 40R has a symmetrical shape with respect to the first flange 40L on the first end side in the central axial line CA direction. Since the shape of each part of the second flange 40R is the same as that of the first flange 40L, the same reference numerals are given and the description thereof is omitted.

A terminal electrode 50 is provided in a lower portion of each flange 40 in the height direction Td. Specifically, a first terminal electrode SOL is provided in a lower portion of the first flange 40L in the height direction Td. The first terminal electrode SOL covers the entire lower end surface 42 of the first flange 40L. In addition, the first terminal electrode SOL covers a part of the lower side of the outer surface 45 of the first flange 40L, a part of the lower side of both the lateral surfaces 43, and a part of the lower side of the inner surface 44. The upper edge of the first terminal electrode 50L is located below the lower surface 32 of the winding core 30. A second terminal electrode 50R is provided in a lower portion of the second flange 40R in the height direction Td. The second terminal electrode 50R has the same configuration as the first terminal electrode 50L.

A wire 60 is wound around the winding core 30. Therefore, the wire 60 is wound in a spiral shape with the central axial line CA as a winding central axis as a whole. The wire 60 is in direct contact with the surface of the winding core 30. In this embodiment, as illustrated in FIG. 3, the wire 60 is wound in a single layer so as not to overlap in the height direction Td when viewed in a cross section including the central axial line CA and along the height direction Td.

Therefore, the upper end of the wire 60 for each round coincides with the position in the height direction Td, and an upper end surface 61 of the wire 60 is a surface connecting the upper end of the wire 60 for each circumference. The portion of the wire 60 wound around the winding core 30 does not reach both the flanges 40 in the length direction Ld. Therefore, a portion around which the wire 60 is not wound exists at both ends of the winding core 30 in the length direction Ld, that is, near the boundary with each flange 40. One end of the wire 60 is connected to the first terminal electrode 50L, and the other end of the wire 60 is connected to the second terminal electrode 50R.

Although not illustrated, the wire 60 has a structure in which wiring made of copper or the like is covered with an insulating film from the outside in the radial direction. In the present embodiment, the diameter of the entire wire 60 including the coating is 85 μm.

The core 20 and the wire 60 are covered with a cover member 70 from above in the height direction Td. The cover member 70 covers the entire upper surface 31 of the winding core 30 and the entire upper end surface 41 of each flange 40. Therefore, the cover member 70 covers a portion from the upper end of the first flange 40L to the upper end of the winding core 30 and a portion from the upper end of the winding core 30 to the upper end of the wire 60 from above. The cover member 70 covers a part of the upper side of both lateral surfaces 33 of the winding core 30, a part of the upper side of both lateral surfaces 33 of the flanges 40, a part of the upper side of both outer surfaces 45 of the flanges 40, and a part of the upper side of the inner surfaces 44 of both flanges 40. The lower edge of the cover member 70 is positioned above the lower surface 32 of the winding core 30. Therefore, the cover member 70 covers a portion from the first flange 40L to the winding core 30 and a portion from the second flange 40R to the winding core 30 from above. Of the surfaces of the core 20 and the wire 60, a portion covered with the cover member 70 is in contact with the cover member 70. An upper surface 71 which is an upper surface of the cover member 70 in the height direction Td is a plane parallel to the upper end surface 41 of the first flange 40L. The cover member 70 has an elastic modulus of 120 MPa or less. In the present embodiment, the material of the cover member 70 is an acrylic resin.

The elastic modulus can be measured by using the following apparatus.

Test apparatus: AGSX-5 kN (Shimadzu Corporation)

Measurement conditions: tensile speed 5.0 mm/min

Here, the shape of the boundary portion between the inner surface 44 and the upper end surface 41 of the flange 40 will be described in detail.

As illustrated in FIG. 3, when viewed from the width direction Wd, a corner of the first flange 40L on the upper side in the height direction Td and on the winding core 30 side in the length direction Ld has a shape cut out in a triangular shape.

Specifically, on the surface of the first flange 40L, the upper end surface 41 and the inner surface 44 are connected by a covered surface 46. The covered surface 46 is inclined so as to be positioned on the lower side in the height direction Td toward the winding core 30 in the length direction Ld. In the present embodiment, when viewed in a cross section including the central axial line CA and along the height direction Td, the covered surface 46 extends linearly inclined with respect to both the height direction Td and the length direction Ld. The covered surface 46 is linear in a range of 100 μm including the end of the first flange 40L on the winding core 30 side in the length direction Ld. That is, the range of the covered surface 46 in the length direction Ld is less than or equal to half the dimension of the first flange 40L in the length direction Ld.

Here, as illustrated in FIG. 3, a straight line extending in the height direction Td and passing through the boundary between the winding core 30 and the first flange 40L when the core 20 is viewed in a cross section including the central axial line CA and along the height direction Td is defined as a first virtual straight line VL1. In the present embodiment, the first virtual straight line VL1 extends along the inner surface 44. In the first flange 40L, a straight line extending in parallel with the central axial line CA and passing through the upper end surface 41 when viewed in a cross section including the central axial line CA and along the height direction Td is defined as a second virtual straight line VL2. In the present embodiment, the second virtual straight line VL2 extends along the upper end surface 41. Further, in the first flange 40L, a straight line extending parallel to the central axial line CA and passing through the lower end surface 42 when viewed in a cross section including the central axial line CA and along the height direction Td is defined as a third virtual straight line VL3. In the present embodiment, the area of a first region E1 surrounded by the surfaces of the first virtual straight line VL1, the second virtual straight line VL2, and the first flange 40L is larger than the area of a second region E2 surrounded by the surfaces of the first virtual straight line VL1, the third virtual straight line VL3, and the first flange 40L. Similarly, also in the second flange 40R, the area of the first region E1 is larger than the area of the second region E2.

As illustrated in FIG. 3, in a sectional view along the height direction Td including the central axial line CA of the wound inductor component 10, an average distance in the height direction Td from the upper end of the first flange 40L to the upper surface of the surface of the cover member 70 is defined as a first average distance D1. In the present embodiment, the upper end of the first flange 40L is the upper end surface 41 that is a plane parallel to the central axial line CA. The upper surface of the surface of the cover member 70 is the upper surface 71. Therefore, the first average distance D1 is an average distance in the height direction Td from the upper end surface 41 of the first flange 40L to the upper surface 71 of the cover member 70, and is specifically 40 μm. In a sectional view along the height direction Td including the central axial line CA of the wound inductor component 10, a second average distance D2 in the height direction Td from the upper surface 31 of the winding core 30 to the upper surface 71 of the cover member 70 is 170 μm. Further, in a sectional view along the height direction Td including the central axial line CA of the wound inductor component 10, an average distance in the height direction Td from the upper end of the wire 60 to the upper surface of the surface of the cover member 70 is defined as a third average distance D3. In the present embodiment, the position of the upper end of the wire 60 in the height direction Td is the position of the upper end surface 61 of the wire 60. Therefore, the third average distance D3 is an average distance in the height direction Td from the upper end surface 61 of the wire 60 to the upper surface 71 of the cover member 70, and is specifically 85 μm. Note that each average distance is determined as an average value of three measured values obtained by measuring a distance in the height direction Td from each upper end to the upper surface 71 of the cover member 70 at three points in one observation field obtained by microscopically observing a cross section including the central axial line CA and extending along the height direction Td at a magnification of 300 times or performing measurement by microscopic observation three times. Similarly, the average distance in the second flange 40R has the same value as that of the first flange 40L.

Next, the operation of the first embodiment will be described.

When the wire 60 of the wound inductor component 10 is energized, the temperature of the cover member 70 increases by being transmitted to the cover member 70 generated by the energization. At this time, the cover member 70 is thermally expanded. The thickness of the cover member 70 in the height direction Td is thin on the upper end surface 41 of the flange 40 and thick on the winding core 30. Also on the winding core 30, the thickness of the cover member 70 is thin at a portion around which the wire 60 is wound and thick at an end portion around which the wire 60 is not wound. In the portion where the thickness of the cover member 70 is changed in this manner, a load is likely to be applied to the cover member 70 along with the temperature change due to the difference in the thermal expansion amount. In particular, since the material of the cover member 70 in the present embodiment is an acrylic resin having a relatively low elastic modulus, it is possible to prevent damage due to thermal expansion and compression of the substrate on which the wound inductor component 10 is mounted and the core 20 at the time of thermal shock, but the thermal expansion amount is correspondingly large. Therefore, the load applied to the cover member 70 becomes correspondingly large.

Next, effects of the first embodiment will be described.

(1-1) According to the first embodiment, in a sectional view along the height direction Td including the central axial line CA of the wound inductor component 10, the first average distance D1 in the height direction Td from the upper end surface 41 of the first flange 40L to the upper surface 71 of the cover member 70 is 40 μm. In a sectional view along the height direction Td including the central axial line CA of the wound inductor component 10, a second average distance D2 in the height direction Td from the upper surface 31 of the winding core 30 to the upper surface 71 of the cover member 70 is 170 μm. Therefore, the first average distance D1 is from 25% to 45% of the second average distance D2. That is, the difference between the first average distance D1, which is the thickness of the portion of the cover member 70 covering the flange 40, and the second average distance D2, which is the thickness of the portion covering the winding core 30, is not excessively large. Therefore, regardless of thermal expansion or contraction of the cover member 70, the difference in the amount of expansion or contraction between the portion of the cover member 70 covering the flange 40 and the portion covering the winding core 30 does not become excessively large. As a result, regardless of an excessive thermal shock applying to the cover member 70, for example, assuming an in-vehicle level, it is possible to suppress occurrence of damage starting from a portion where the thickness of the cover member 70 changes. In addition, since the thickness of the cover member 70 is not excessively large, it is possible to suppress an increase in size of the wound inductor component 10.

(1-2) According to the first embodiment, in a sectional view along the height direction Td including the central axial line CA of the wound inductor component 10, the third average distance D3 in the height direction Td from the upper end surface 61 of the wire 60 to the upper surface 71 of the cover member 70 is 85 μm. Therefore, the third average distance D3 is 50% or more of the second average distance D2. That is, the difference between the second average distance D2, which is the thickness of the portion of the cover member 70 covering the winding core 30, and the third average distance D3, which is the thickness of the portion covering the wire 60, is not excessively large. Therefore, regardless of the thermal expansion or contraction of the cover member 70, the difference in the amount of expansion or contraction between the portion covering the winding core 30 and the portion covering the wire 60 in the cover member 70 does not become excessively large. As a result, regardless of an excessive thermal shock applying to the cover member 70, it is possible to suppress occurrence of damage starting from a place where the thickness of the cover member 70 changes.

(1-3) In the first embodiment, the material of the cover member 70 is an acrylic resin. The elastic modulus of the acrylic resin is relatively low. Therefore, damage due to thermal expansion and compression between the substrate on which the wound inductor component 10 is mounted and the core 20 can be prevented.

(1-4) In the first embodiment, the upper end surface 41 of the first flange 40L is an upper end in the height direction Td. That is, the upper end of the first flange 40L is a plane orthogonal to the height direction Td. Therefore, the thickness of the cover member 70 is uniform within a corresponding range. If the upper surface of the first flange 40L has irregularities, stress may be applied to portions having different thicknesses of the cover member 70 due to thermal expansion and compression, but in the first embodiment, such stress is not applied. As a result, damage when a thermal shock is applied to the cover member 70 can be suppressed in a wider range.

(1-5) According to the first embodiment, the area of the first region E1 is larger than the area of the second region E2. Then, at a location of the first region E1, the change in the thickness of the cover member 70 in the length direction Ld becomes gentle as compared with the case where the cover member is provided in the second region E2. By making the change in the thickness of the cover member 70 gentle in this manner, it is possible to suppress a rapid change in the thermal expansion amount, and it is possible to suppress damage to the cover member 70 due to thermal expansion.

(1-6) According to the first embodiment, the covered surface 46 of the first flange 40L is linear when viewed in a cross section including the central axial line CA and along the height direction Td. Therefore, the covered surface 46 can be formed by linearly cutting the boundary portion between the upper end surface 41 and the inner surface 44 of the first flange 40L, and complicated processing is not necessarily required.

(1-7) According to the first embodiment, the corners of the flange 40 are chamfered. For example, a boundary portion between the upper end surface 41 of the first flange 40L and the both lateral surfaces 43 and a boundary portion between the upper end surface 41 of the first flange 40L and the outer surface 45 are chamfered. The thickness of the cover member 70 covering the chamfered boundary portions gradually changes according to the chamfered shape. By eliminating the portion where the thickness of the cover member 70 suddenly changes in this manner, it is possible to prevent the cover member 70 from being damaged due to a thermal shock.

(1-8) According to the first embodiment, since the upper surface 71 of the cover member 70 is a flat surface, for example, when the wound inductor component 10 is mounted on the substrate, the upper surface 71 of the cover member 70 is easily sucked and conveyed by a suction nozzle.

Second Embodiment

Hereinafter, a second embodiment of the wound inductor component will be described. In a wound inductor component 110 according to the second embodiment, the shape of a covered surface 146 of the flange 40 in the core 20 is mainly different from that of the first embodiment. In the following description, the same components as those of the first embodiment are denoted by the same reference numerals, and the description thereof will be omitted or simplified.

Figure 5:
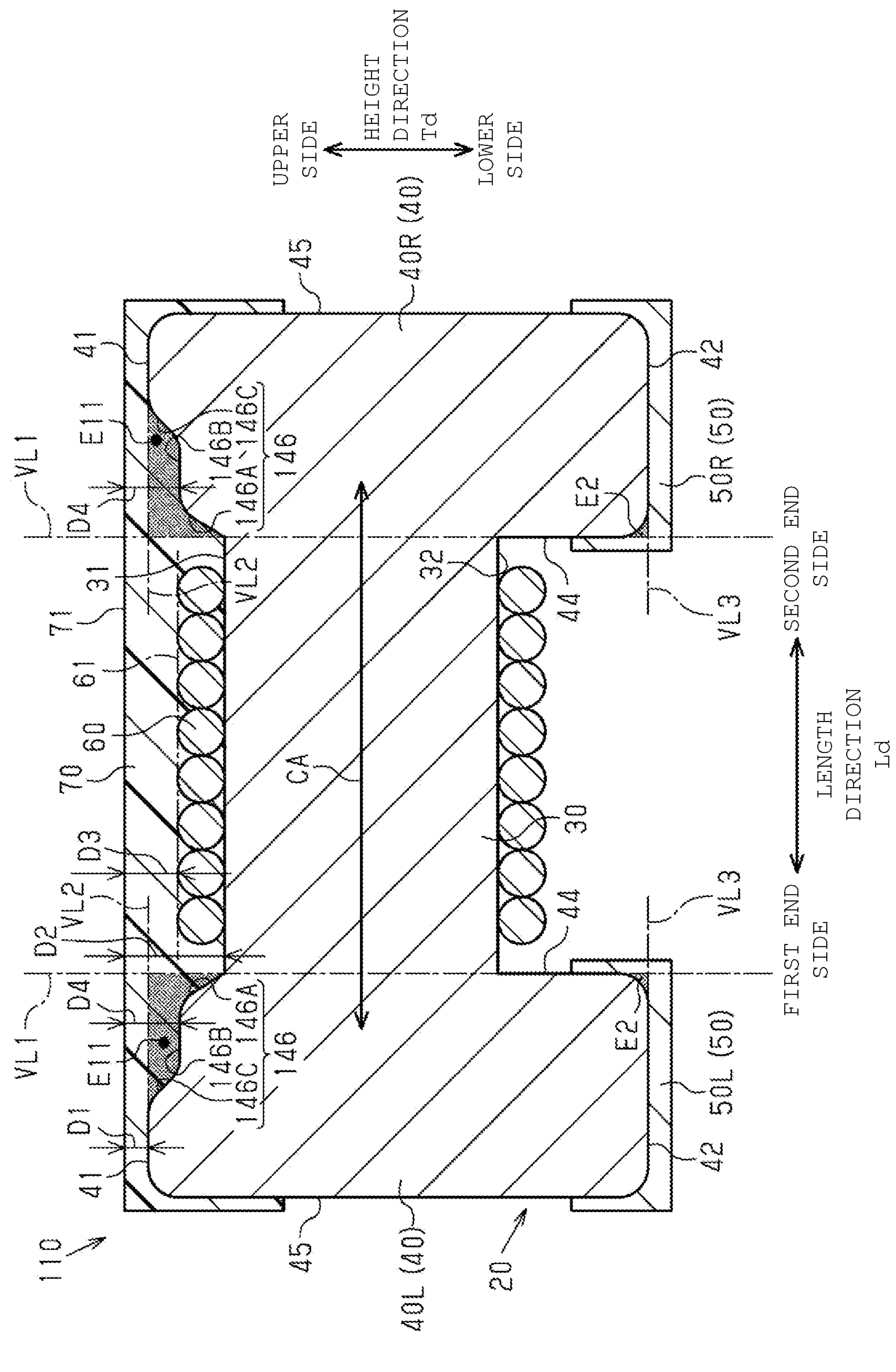
FIG. 5 is a sectional view of a wound inductor component according to a second embodiment.

As illustrated in FIG. 5, the covered surface 146 of the first flange 40L includes a first inclined surface 146A, a flat surface 146B, and a second inclined surface 146C.

In a sectional view along the height direction Td including the central axial line CA of the wound inductor component 110, the first inclined surface 146A is provided at an end of the covered surface 146 on the winding core 30 side in the length direction Ld. An end of the first inclined surface 146A on the winding core 30 side in the length direction Ld is connected to an end of the upper surface 31 of the winding core 30 on the first end side in the length direction Ld. The first inclined surface 146A extends so as to be inclined with respect to the upper surface 31 of the winding core 30 so as to be positioned on the upper side in the height direction Td toward the first end side in the length direction Ld. An end of the first inclined surface 146A on the first end side in the length direction Ld is located substantially at the center between the position of the upper surface 31 of the winding core 30 and the position of the upper end surface 41 of the first flange 40L in the height direction Td.

In a sectional view along the height direction Td including the central axial line CA, the flat surface 146B is connected to an end of the first inclined surface 146A on the first end side in the length direction Ld. The flat surface 146B extends in parallel with the length direction Ld in a sectional view along the height direction Td including the central axial line CA. The position of the flat surface 146B in the height direction Td is an intermediate position between the upper surface 31 of the winding core 30 and the upper end surface 41 of the first flange 40L. An end of the flat surface 146B on the first end side in the length direction Ld reaches substantially the center of the first flange 40L in the length direction Ld.

In a sectional view along the height direction Td including the central axial line CA, the second inclined surface 146C is connected to an end of the flat surface 146B on the first end side in the length direction Ld. The second inclined surface 146C extends so as to be inclined with respect to the upper surface 31 of the winding core 30 so as to be positioned on the upper side in the height direction Td toward the first end side in the length direction Ld. An end of the second inclined surface 146C on the first end side in the length direction Ld is connected to the upper end surface 41 of the first flange 40L.

As described above, in a sectional view along the height direction Td including the central axial line CA, the flat surface 146B extends between the first inclined surface 146A and the second inclined surface 146C on the covered surface 146 of the first flange 40L. Therefore, two steps are formed between the upper end surface 41 of the first flange 40L and the upper surface 31 of the winding core 30 with the flat surface 146B interposed therebetween.

In a sectional view along the height direction Td including the central axial line CA, a step distance D4 in the height direction Td from the flat surface 146B to the upper surface 71 of the cover member 70 is 105 μm. Therefore, the step distance D4 is twice or more of the first average distance D1 and less than the second average distance D2.

Here, it is assumed that the first virtual straight line VL1, the second virtual straight line VL2, and the third virtual straight line VL3 are drawn as in the first embodiment described above. At this time, the area of a first region E11 surrounded by the surfaces of the first virtual straight line VL1, the second virtual straight line VL2, and the first flange 40L is larger than the area of the second region E2 surrounded by the surfaces of the first virtual straight line VL1, the third virtual straight line VL3, and the first flange 40L.

Note that the shape of the covered surface 146 in the second embodiment is different from that in the first embodiment described above. As a result, the shape of the first region E11 in the second embodiment is different from the shape of the first region E1 in the first embodiment. In particular, the area of the first region E11 of the second embodiment is larger than that of the first region E1 of the first embodiment.

Next, functions and effects of the second embodiment will be described. According to the second embodiment, in addition to the effects of (1-1) to (1-8) described above, the following effects are further obtained.

(2-1) According to the second embodiment, the covered surface 146 of the first flange 40L includes the first inclined surface 146A, the flat surface 146B, and the second inclined surface 146C when viewed in a cross section along the height direction Td including the central axial line CA. Since the flat surface 146B includes in this manner, the thickness of the cover member 70 covering the flat surface 146B is larger than the thickness of the cover member 70 covering the upper end surface 41 of the first flange 40L, and is smaller than the thickness of the upper surface 31 of the winding core 30. Therefore, the degree of change in the thickness of the cover member 70 can be made gentler than when the upper end surface 41 of the first flange 40L and the upper surface 31 of the winding core 30 are connected by one inclined surface.

(2-2) According to the second embodiment, the step distance D4 is twice or more of the first average distance D1. Therefore, the thickness of the upper portion of the flat surface 146B is correspondingly larger than the thickness of the upper portion of the upper end surface 41 of the first flange 40L where the thickness of the cover member 70 is the smallest. Therefore, damage to the cover member 70 in the upper portion of the flat surface 146B due to an excessive thermal shock to the cover member 70 can be suppressed.

Third Embodiment

Hereinafter, a third embodiment of the wound inductor component will be described. A wound inductor component 210 according to the third embodiment is different from the first embodiment mainly in the shape of the flange 40. In the following description, the same components as those of the first embodiment are denoted by the same reference numerals, and the description thereof will be omitted or simplified.

Figure 6:
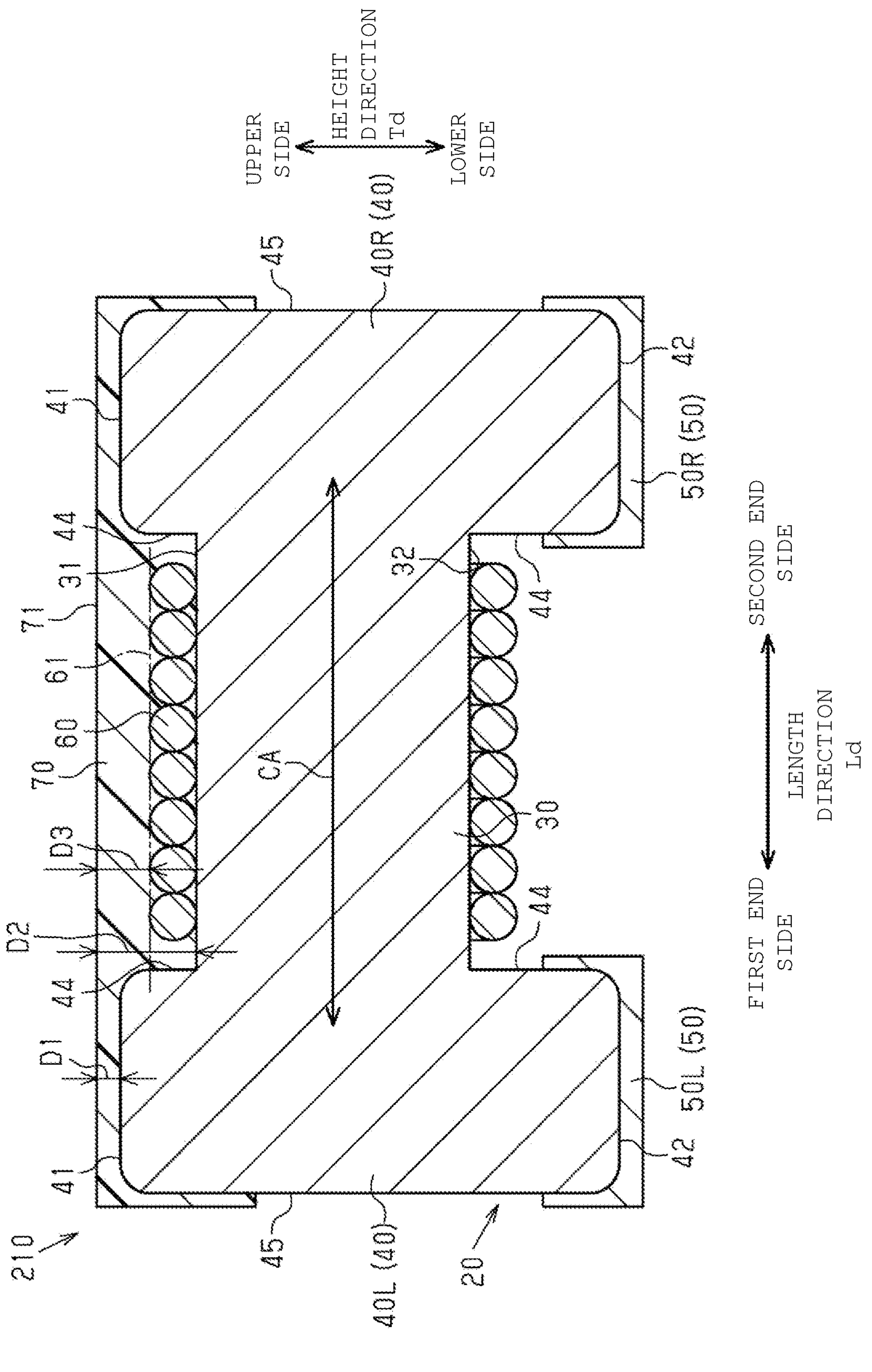
FIG. 6 is a sectional view of a wound inductor component according to a third embodiment.

As illustrated in FIG. 6, a boundary portion between upper end surface 41 and inner surface 44 in first flange 40L has a round chamfered shape. A round chamfered shape of the boundary portion between the upper end surface 41 and the inner surface 44 is the same as the round chamfered shape of another surface, for example, a boundary portion between the upper end surface 41 and the outer surface 45.

Hereinafter, a result of actually creating and evaluating an example of the wound inductor component 210 will be described.

As examples and comparative examples of the wound inductor component 210, samples having different first average distances D1 of the cover member 70 have been prepared. Specifically, as a comparative example, a sample having the first average distance D1 of 20 μm and a sample having the first average distance D1 of 30 μm have been prepared. In addition, samples having the first average distance D1 of 40 μm, 50 μm, 60 μm, 70 μm, 80 μm, 90 μm, and 100 μm have been prepared as examples. The distance from the upper end surface 41 of the first flange 40L to the upper surface 31 of the winding core 30 is 130 μm. Therefore, the second average distance D2 is "130+D1" μm.

These samples are subjected to a thermal shock test at −55° C. to 125° C. for 2000 cycles. For each sample after the thermal shock test, the cover member 70 is observed with an optical microscope and an electron microscope to confirm the presence or absence of cracks. As a result, cracks have been confirmed in the sample of the comparative example, but cracks have not been confirmed in the sample of the example. That is, it has been found that damage to the cover member 70 can be prevented by securing 40 μm or more as the first average distance D1 and 25% or more as the ratio to the second average distance D2.

Next, effects of the third embodiment will be described. According to the third embodiment, in addition to the effects of (1-4), (1-7), and (1-8) described above, the following effects are further obtained.

(3-1) In the third embodiment, the first average distance D1, that is, and the damage of the cover member 70 due to the thermal shock is suppressed by securing the thickness of the cover member 70 on the first flange 40L to 40 μm or more and the ratio of the thickness to the second average distance D2 to 25% or more. Therefore, the damage of the cover member 70 can be prevented by adjusting the thickness of the cover member 70 without changing the shape of the first flange 40L from the conventional technique.

Each of the above embodiments can be modified as follows. Each embodiment and the following modifications can be implemented in combination within a range not technically contradictory.

In each of the above embodiments, other boundary portions may not be chamfered except for the boundary portion between the upper end surface 41 and the inner surface 44 among the corners of the flange 40. Note that the method of processing the corners of the core 20 into a chamfered shape is not limited, and a mold for molding the core 20 may have a chamfered shape, or the molded core 20 may be chamfered by barrel finishing.

In each of the above embodiments, the dimension of the core 20 is not limited to the example of the above embodiment. Regardless of the dimension of the core 20, damage to the cover member 70 can be suppressed as long as the first average distance D1 is 25% or more of the second average distance D2.

In each of the above embodiments, the material of the core 20 is not limited to the example of each of the above embodiments. For example, the material of the core 20 may be alumina or resin. The core 20 may be a resin molded body.

In each of the above embodiments, the shape of the winding core 30 may be a columnar shape, and may be a columnar shape or a polygonal columnar shape. At the boundary portion of the winding core 30 with the flange 40, the end portion of the winding core 30 may spread so as to be away from the central axial line CA as approaching the flange 40. In this case, the boundary between the winding core 30 and the flange 40 is the inner surface 44 orthogonal to the length direction Ld. When the flange 40 does not have a surface orthogonal to the length direction Ld, if there is a corner between the surface of the flange 40 and the surface of the winding core 30 in a sectional view including the central axial line CA, the corner is a boundary, and if there is an inflection point, the inflection point is a boundary.

In each of the above embodiments, the shape of the flange 40 may be spherical or polygonal columnar. That is, a part or the whole of the surface of the flange 40 may be formed of a curved surface. At least the flange 40 only needs to protrude to both sides of the winding core 30 in the height direction Td when viewed from the central axial line CA direction. The amount of protrusion of the flange 40 upward from the winding core 30 may be equal to or less than the amount of protrusion of the flange 40 downward from the winding core 30.

In the first and second embodiments, the surface constituting the covered surface may not have a portion extending linearly in a sectional view. For example, the first inclined surface 146A and the second inclined surface 146C in the second embodiment may be curved surfaces. In addition, all of the covered surfaces 46 in the first embodiment may have a curved surface, that is, an arc shape in sectional view. In this case, the covered surface 46 can be formed by R processing. For example, the covered surface may be a combination of a straight line and a curved line.

In the second embodiment, three or more steps may be provided on the covered surface 146. In this case, the step distance per step in the height direction Td is preferably twice or more of the step distance of another step located above the step. More specifically, in this case, a plurality of flat surfaces are provided, and the other flat surface is located on the upper side and on the side opposite to the winding core 30 in the length direction Ld with respect to one flat surface. The step distance on one flat surface may be twice or more of the step distance on the other flat surface. In this case, the difference in thickness of the cover member 70 between the steps is reduced. Therefore, since the difference in thickness of the cover member 70 between the steps is increased, it is possible to suppress damage due to expansion and contraction of the cover member 70 when a thermal shock is applied to the cover member 70 in the upper portion of the step. In particular, it is preferable when the amount of protrusion of the flange 40 upward from the winding core 30 is larger than that in each of the above embodiments.

In the first and second embodiments, the area of the first region may be smaller than the area of the second region E2. Regardless of the size of the area of the first region, damage to the cover member 70 can be prevented as long as the first average distance D1 is 40 μm or more or the first average distance D1 is 25% or more of the second average distance D2. However, when the first average distance D1 exceeds 45% of the second average distance D2, the effect of preventing damage to the cover member 70 reaches a peak while the dimension of the wound inductor component in the height direction Td increases. Therefore, from the viewpoint of downsizing the wound inductor component, the first average distance D1 needs to be 45% or less of the second average distance D2.

In each of the above embodiments, the position of the terminal electrode 50 is not limited to the example of the above embodiment. For example, the terminal electrode 50 may be disposed only on the lower end surface 42 of the flange 40.

In each of the above embodiments, the terminal electrode 50 may be formed by laminating a plurality of metal layers.

For example, a layer of each metal of silver, copper, nickel, and tin may be sequentially laminated. In addition, the terminal electrode 50 may be formed by baking or plating a conductor, or may be formed by attaching a metal plate.

In each of the above embodiments, the dimension of the diameter of the wire 60 is not limited to the example of the above embodiment. The ratio of the third average distance D3 to the second average distance D2 also changes by changing the diameter dimension of the wire 60, but the ratio of the third average distance D3 to the second average distance D2 may be less than 50%, or less than 85 μm. The diameter of the wire 60 is preferably 15 μm or more and 85 μm or less (i.e., from 15 μm to 85 μm).

In each of the above embodiments, the plurality of wires 60 may be wound around the winding core 30. In this case, the number of terminal electrodes 50 may be increased in accordance with the number of ends of the wire 60. In this case, the upper end surface 61 of the wire 60 is a surface connecting the upper ends of the wires 60 wound outermost.

In each of the above embodiments, the material of the cover member 70 is not limited to the acrylic resin. For example, the material of the cover member 70 may be a urethane-based resin, an epoxy-based resin, or a silicon-based resin. The elastic modulus of the cover member 70 is not limited to the example of the above embodiment. For example, since the material of the cover member 70 has an elastic modulus of 6 GPa or less, it is possible to prevent peeling at a portion where the core 20 and the cover member 70 are in contact with each other. In particular, since the material of the cover member 70 has an elastic modulus of 120 MPa or less, more reliability against peeling can be secured. Further, since the material of the cover member 70 has an elastic modulus of 0.5 MPa or more, it is possible to suppress the wound inductor components 10 from sticking to each other during conveyance and mounting of the wound inductor components 10.

In each of the above embodiments, the cover member 70 may not cover the entire upper side of the core 20 and the wire 60. At least the portion from the upper end of the first flange 40L to the upper end of the winding core 30 may be covered. When the third average distance D3 is less than 50% of the second average distance D2, or less than 85 μm, the cover member 70 may not cover the upper end of the wire 60 from above.

What is claimed is:

1. A wound inductor component comprising:

a columnar winding core;

a first flange and a second flange which are connected to both ends of the winding core in a central axial line direction of the winding core and protrude from the winding core to both sides in a first direction orthogonal to the central axial line direction of the winding core, when a central axial line is defined as a line through which a center of the winding core passes in an extending direction of the winding core, and the central axial line direction is defined as a direction in which the central axial line extends;

a wire wound around the winding core; and a cover member covering, from one side in the first direction, a portion from an end of the first flange on one side in the first direction to an end of the winding core on one side in the first direction, wherein when viewed in a sectional view including the central axial line and along the first direction, a first average distance that is an average distance in the first direction from an end of the first flange on one side in the first direction to a surface of the cover member on one side in the first direction is from 25% to 45% of a second average distance that is an average distance in the first direction from an end of the winding core on one side in the first direction to the surface of the cover member on one side in the first direction.

2. The wound inductor component according to claim 1, wherein the cover member covers, from the first direction, a portion from an end of the winding core on one side in the first direction to an end of the wire on one side in the first direction, and a third average distance, that is an average distance in the first direction from an end of the wire on one side in the first direction to a surface of the cover member on one side in the first direction, is 50% or more of the second average distance when viewed in a sectional view including the central axial line and along the first direction.

3. A wound inductor component comprising:

a columnar winding core;

a first flange and a second flange which are connected to both ends of the winding core in a central axial line direction of the winding core and protrude from the winding core to both sides in a first direction orthogonal to the central axial line direction of the winding core, when a central axial line is defined as a line through which a center of the winding core passes in an extending direction of the winding core, and the central axial line direction is defined as a direction in which the central axial line extends;

a wire wound around the winding core; and a cover member covering, from one side in the first direction, a portion from an end of the first flange on one side in the first direction to an end of the winding core on one side in the first direction, wherein a first average distance that is an average distance in the first direction from an end of the first flange on one side in the first direction to a surface of the cover member on one side in the first direction is from 40 μm to 100 μm when viewed in a sectional view including the central axial line and along the first direction.

4. The wound inductor component according to claim 3, wherein the cover member covers, from the first direction, a portion from an end of the winding core on one side in the first direction to an end of the wire on one side in the first direction, and a third average distance, that is an average distance in the first direction from an end of the wire on one side in the first direction to a surface of the cover member on one side in the first direction, is 85 μm or more when viewed in a sectional view including the central axial line and along the first direction.

5. The wound inductor component according to claim 1, wherein a material of the cover member is an acrylic resin.

6. The wound inductor component according to claim 1, wherein an end of the first flange on one side in the first direction is included in a plane orthogonal to the first direction.

7. The wound inductor component according to claim 1, wherein an elastic modulus of the cover member is 120 MPa or less.

8. The wound inductor component according to claim 2, wherein a material of the cover member is an acrylic resin.

9. The wound inductor component according to claim 3, wherein a material of the cover member is an acrylic resin.

10. The wound inductor component according to claim 4, wherein a material of the cover member is an acrylic resin.

11. The wound inductor component according to claim 2, wherein an end of the first flange on one side in the first direction is included in a plane orthogonal to the first direction.

12. The wound inductor component according to claim 3, wherein an end of the first flange on one side in the first direction is included in a plane orthogonal to the first direction.

13. The wound inductor component according to claim 4, wherein an end of the first flange on one side in the first direction is included in a plane orthogonal to the first direction.

14. The wound inductor component according to claim 5, wherein an end of the first flange on one side in the first direction is included in a plane orthogonal to the first direction.

15. The wound inductor component according to claim 8, wherein an end of the first flange on one side in the first direction is included in a plane orthogonal to the first direction.

16. The wound inductor component according to claim 2, wherein an elastic modulus of the cover member is 120 MPa or less.

17. The wound inductor component according to claim 3, wherein an elastic modulus of the cover member is 120 MPa or less.

18. The wound inductor component according to claim 4, wherein an elastic modulus of the cover member is 120 MPa or less.

19. The wound inductor component according to claim 5, wherein an elastic modulus of the cover member is 120 MPa or less.

20. The wound inductor component according to claim 6, wherein an elastic modulus of the cover member is 120 MPa or less.

* * * * *